United States Patent Office 3,507,624
Patented Apr. 21, 1970

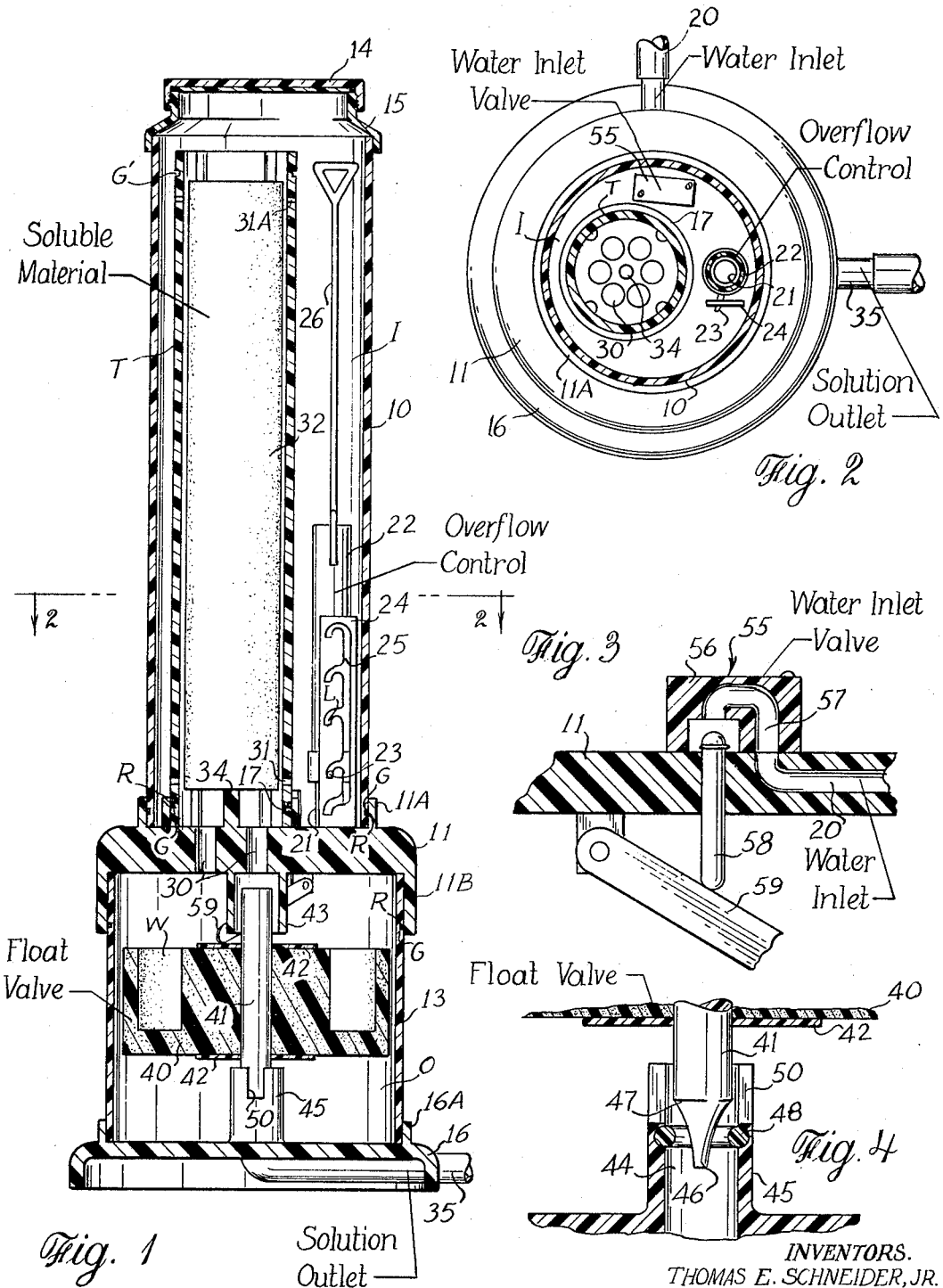

3,507,624
CHEMICAL FEEDER USING JETS OF LIQUID AGAINST SOLID BODY OF CHEMICALS
Thomas E. Schneider, Jr., and Marion R. Carstens, Atlanta, and Homer J. Bates, Roswell, Ga., assignors to Tesco Chemicals, Inc., Atlanta, Ga., a corporation of Georgia
Continuation-in-part of application Ser. No. 403,963, Oct. 12, 1964. This application Sept. 14, 1966, Ser. No. 579,253
Int. Cl. B01d 11/00
U.S. Cl. 23—271                                6 Claims

ABSTRACT OF THE DISCLOSURE

A chemical feeding device having an upper chamber in which a tube containing a chemical in solid form is placed and from which a liquid passes into the tube through a first plurality of orifices or a second plurality of orifices depending upon which end of the tube is lowermost in the upper chamber. The device includes a lower chamber into which a liquid passes from the tube and into which a liquid also passes from the upper chamber when the level of a liquid in the upper chamber is in excess of a particular height. The device also includes a buoyant body movable within the lower chamber in response to the level of a liquid in the lower chamber, a first valve means responsive to motion of the buoyant body to control entry of a liquid into the upper chamber, and a second valve means responsive to motion of the buoyant body to control discharge of a liquid from the lower chamber.

---

This application is a continuation-in-part application of copending application Ser. No. 403,963 filed Oct. 12, 1964, now U.S. Patent No. 3,323,539, issued June 6, 1967.

This application relates to apparatus for supplying a chemical or chemicals to liquids in a controlled manner proportionate to the rate of liquid flow.

While various aspects of the present inventive concept are applicable in the feeding of wide varieties of chemical substances to wide varieties of liquids, the present illustrative embodiment of the invention is described herein as an apparatus for supplying chemicals to water for purification purposes and to reduce, prevent and inhibit the growth of various micro-organisms. The above-identified copending application is hereby incorporated by way of reference since certain objects, features and advantages of said application.

The treatment of water has long been accomplished by the periodic treatment of the water with relatively soluble chemical compounds in granular, liquid, or pellet form. Such procedure is frequently uneconomical, inefficient and ineffective. To effect an adequately sustained treatment, the quantity of relatively soluble chemical compound periodically administered is necessarily excessive since substantial amounts of the active chemical compounds are immediately liberated to the atmosphere without effective purification of the water or inhibition of micro-organism growth. Further, the maintenance of adequate active-chemical content by such periodic application of soluble chemicals is subject to human frailties of memory and judgment. Methods and apparatus have also been developed for the treatment of water by the use of chemicals solely in gaseous form. However, such apparatus and methods are expensive as to manufacture, installation and maintenance, and may be lethally dangerous in that such apparatus is subject to leakage of the gas.

In common with the invention of the aforementioned application, the present invention provides for the treatment of liquids with a relatively insoluble solid body of chemicals. Since the quantity and velocity of liquid circulated in contact with the body of chemicals may be readily adjusted, the degree of treatment may be easily controlled. Further in common with the invention of said prior application, the present invention provides for the forceful impingement of circulated liquid against the solid body of chemicals by the simultaneous impingement of a plurality of jet streams at a multiplicity of points at the end of a circular stick of the body and for the control of the pressure of said jets whereby it may be more rapidly eroded to enhance the rate of supply of treating chemicals to the liquid. Unlike the aforementioned application, however, the present invention provides for the prevention of the device overflowing and completely wetting the solid body of chemicals if the discharge therefrom becomes blocked. Moreover, the present embodiment of the invention provides for easy maintenance of the device since the device may be assembled and disassembled manually without the use of any tools. Also, the size of the jet streams may be varied simply by inverting the support member for the solid body of chemicals.

Therefore, it is among the primary objects of the present invention to provide means for feeding chemicals into a body of liquid by the circulation of the liquid in contact with a solid body of relatively insoluble chemicals.

A further object of the invention is to provide an improved means by which a solid body of chemicals, in stick form, may be uniformly dissolved over a wide range of dissolution rates into a circulated liquid.

It is also an object of the invention to provide means for positively precluding excessive pressure of the liquid impinging against the solid body of chemicals.

The objectives of the invention further include that of providing liquid responsive flow control means precluding air entraining through the chamber and a resultant air lock of the pump.

Another object of the invention is to provide liquid responsive flow control means precluding overflow of the device and the resulting total wetting of the solid body of chemicals if the discharge from the device becomes blocked.

Another object of the invention is to provide a device easily disassembled and assembled to provide for easy maintenance thereof.

These and other objects, features and advantages of the present invention will be more clearly understood from the following detailed description and the accompanying drawings in which like characters of reference designate the corresponding parts in the figures of the drawings and in which:

FIG. 1 is a vertical sectional view of one embodiment of the treatment chamber of the present invention;

FIG. 2 is a horizontal transverse section taken on the lines 2—2 of FIG. 1 with the solid stick of chemicals removed;

FIG. 3 is a detailed vertical section of the inlet valve of the liquid responsive flow control means; and, FIG. 4 is a detailed vertical section of the discharge valve of the liquid responsive flow control means.

Referring now to FIGS. 1 and 2 of the drawings, the embodiment of the invention disclosed herein includes an enclosing cylinder 10, a lower cylinder 13, and a transverse wall 11 separating the bottom of the cylinder 10 and the top of the lower cylinder 13. The top of the wall 11 is flanged as at 11a to receive the bottom of the cylinder 10 and the bottom of the wall 11 is flanged as at 11b to receive the top of the lower cylinder 13. The bottom of the cylinder 10 is provided with a groove G which receives an O-ring seal R to lock the cylinder 10 in the flange 11a. The top of the lower cylinder 13 is also equipped with a groove G which carries an O-ring seal R to hold the wall 11 in place on the cylinder 13.

The upper open end of the cylinder 10 is normally closed by a removable cap 14 threadedly engaging the upper end of a reduced connecting piece 15 fixedly or removably mounted on the top end of the cylinder 10. The lower end of the cylinder 13 is closed by a bottom plate 16 having an appropriate flange 16a thereon for sealingly receiving the cylinder 13.

An open ended receiving tube T is carried within the inlet chamber I by an annular upright flange 17 on the top of the transverse wall 11. The tube T is held in place by an O-ring seal R carried by a groove G in the lower end of the tube T.

The liquid to be treated is supplied to the water inlet chamber I through the inlet passage 20 defined in the wall 11. The head of liquid which may accumulate within the upper inlet chamber I is limited by the effective height of a standpipe 21. To increase or decrease the head of liquid, and hence the liquid pressure at the lower end of the chamber I, a slidable nipple 22 is applied to the upper end of the standpipe 21. For adjusting the relative position of the nipple 22 on the standpipe 21, and hence the effective height of the standpipe, a retaining tab 23 is formed on one side of the nipple 22. A vertically extending, slotted adjustment member 24 is fixedly mounted on the transverse wall 11 and slidably receives the retaining tab 23 through the slot 25 therein. A plurality of grooved lands L connecting with the slot 25 are provided in the member 24 and are effective to receive and retain the tab 23 therein to fix the height of the nipple 22. The nipple 22 may be raised or lowered by grasping a handle 26 extending upwardly from and fixedly attached to the nipple 22 and properly manipulating it. The handle 26 may be easily grasped by removing the cap 14 and reaching into the chamber I.

The receiving tube T for the solid body of chemicals is mounted over and surrounds a group of discharge ports 30 extending through the transverse wall 11 to the outlet chamber O. Adjacent the lower end of the tube T there is provided a series of radially extending equally spaced jet ports 31 for impinging jet streams of liquid from the inlet chamber I against the lower end of a solid body of chemicals indicated by the numeral 32. A second plurality of radially extending equally spaced jet ports 31a are provided adjacent the upper end of the tube T so that the tube T may be reversed in the flange 17 to provide different size jet streams. A groove G' is provided around the top end of the tube T to receive an O-ring to seal and hold the tube T in place, when inverted.

For supporting the lower end of the solid body of chemicals 32 in substantial registration with the plane of the jet ports 31 or 31a when tube T is inverted, a central vertical rod 34 is provided extending upwardly from the transverse wall 11 to a height slightly below the plane of the bottom of the jet ports. Treated liquid is delivered from the tube T through the discharge ports 30 to the outlet chamber O.

The treated liquid is discharged from the outlet or delivery chamber O through a delivery tube 35. However, it has been found advantageous to restrict the discharge of liquid from the chamber O to periods when a predetermined volume or head of liquid has accumulated in the chamber O. This is particularly true, if not a requirement, where the delivery tube 35 is directly connected, without interventing safe guards, to the suction side of a circulation pump (not shown). In such case, should the suction be applied while no liquid was in the chamber O, air could be drawn into the pump chamber (not shown) to produce a vapor or air lock in the pump requiring a repriming of the pump to restore normal operation.

Therefore, a liquid responsive flow control float is mounted within the chamber O. A presently suggested float construction is the use of a buoyant body 40 of cellular plastic, preferably of the closed cell or non-communicating cell type, secured on a valve rod 41 between securing plates 42. A plurality of recesses W are formed in the body 40 from the top thereof to insure seating of the valve rod 41 when a predetermined amount of liquid is received in the chamber O. The recesses W receive liquid discharged through the ports 30 to weight the body 40 and insure the aforementioned seating. The upper end of the valve rod 41 is loosely confined within a short guide cylinder 43 depending from the central underface of the transverse wall 11. The lower end of the valve rod 41 fits loosely within the vertical valve chamber 44 of a valve block 45, as shown in FIG. 4, and terminates in a generally tapering or conical valve element 46 which forms a shoulder 47 at its juncture with the uniformly cylindrical valve rod 41. A valve seat is formed by an O-ring 48 mounted within a seating recess 49 of the chamber 44. Below the O-ring valve seat 48 the valve chamber 44 is in open communication with the delivery tube 35.

An important feature of the design of the valve block 45 is the arrangement of lateral inlet slots 50 opening into the vertical valve chamber 44. The slots 50 are multiple and circumferentially spaced equally. As an illustration, the slots 50 are shown as four in number to provide two pairs of diametrically opposite ports, each port being spaced 90° from the other. This is effective to balance the fluid pressure on the valve stem 41. As will be noted, the valve stem 41 and its float 40 are free floating by virtue of the loose fit of the stem 41 within the valve chamber 44. The balanced lateral pressure thus insures a straight rectilinear movement of the stem 41 without friction imposing and movement retarding guides. This construction not only insures sensitive movement of the valve in response to the liquid level within the chamber O, but also insures uniform responsive flow proportionate to the position of the stem 41 within the valve chamber 44. Further, the flow is non-turbulent since the balanced admission of water from all sides of the valve insures smooth flow free from eddies and churning.

It should be understood that while slots have been illustrated and described in connection with the valve block 45 ports may also be employed. The cross-sections of the slots or ports may also be varied from the rectangular configuration shown.

It has also been found advantageous to restrict the inflow of liquid through the inlet pipe 20 since the device will overflow and wet all of the chemical stick 32 if the delivery of water from the delivery chamber O becomes blocked. Therefore, an inlet valve 55 is provided in the inlet pipe 20.

As shown in FIG. 3, the valve 55 comprises a valve body 56 having a passage 57 extending therethrough in communication with the inlet pipe 20. A reciprocal valve member 58 is carried by the wall 11 and is effective to close the passage 57 in one position and open the passage 57 in another position to permit the free flow of liquid from the pipe 20 through the passage 57. A pivotably mounted actuator arm 59 is carried by the transverse wall 11 and rests on the upper securing plate 42 so as to be manipulated thereby upon movement thereof. The arm 59 also engages the lower end of the valve member 58 and is effective to close the passage 57 when the liquid in the chamber O has lifted the buoyant body 40 to its uppermost position. Likewise, the passage 57 is open when the buoyant member 40 is in its lowermost position. This, it will be seen is effective to prevent the chamber O from overfilling and wetting more of the body 32 than that which becomes wet by the streams through the ports 31.

The device as described above may be generally used in connection with feeding chemicals into a liquid by gradual erosion and/or dissolution of a solid body of chemicals. A particular effective use of the device of the present invention is in the chlorination treatment of water and specifically with regard to swimming pools.

The solid body of chemicals 32 is here shown as a generally cylindrical rod and of uniform diameter. Other configurations may also be used. One material which has been successfully used in forming the body is dichloro-s-triazinetrione. This material with a two percent inlet binder is formed into the cylindrical rod-like bodies by any suitable procedure such as molding or extrusion. The term relatively insoluble is used as a comparison with such readily soluble materials such as liquid sodium hypochlorite or granular calcium hypochlorite used in the chlorination treatment of swimming pools.

OPERATION

In the operation of the treatment chamber, the liquid to be treated is delivered to the chamber I through the inlet pipe 20 at a volume rate greater than the volume rate discharge through the jet ports 31 so as to reach a level above the jet ports 31 and preferably at a level approximately at the plane of the upper end of the standpipe nipple 22. Should the inflow of the liquid through the supply pipe 20 be such that the liquid level will rise above the open end of the standpipe nipple 22, that liquid above the end of the nipple 22 will drain down through the nipple 22 and standpipe 21 to be delivered from the chamber I into the chamber O. Thus, the height of the nipple 22 on the standpipe 21 will determine the maximum head of liquid within the upper inlet chamber I and hence the maximum pressure of the water at the jet ports 31.

By the provision of the adjustable standpipe nipple 22, the pressure of the applied jet streams issuing from the ports 31 or 31a may be varied to control the dissolution and/or erosion rate of the solid body of chemicals 32 within the tube T while simultaneously precluding the build-up of excessive pressure in the jet streams. This important feature of the invention is accomplished simply by grasping the handle 26 and properly manipulating it to raise or lower the nipple 22 and lock the tab 23 in place on one of the lands L.

If it is desirable to discharge a larger volume of liquid against the lower end of the body 32 than is possible using the ports 31, the tube T may be removed from the flange 17, inverted and reinserted in the flange 17 thereby placing the larger ports 31a adjacent the lower end of the body 32 so that liquid in the chamber I passes through the ports 31a for impingement against the body 32. It is to be understood that the pressure of the jet streams issuing from the ports 31a may be varied by adjustment of the nipple 22 as hereinbefore described.

As the liquid impinged against the lower end of the body 32 drains through the discharge ports 30 onto the top surface of the float body 40, a portion thereof serves to fill the recesses W formed in the body 40 thereby increasing the effective weight of the body 40. This insures sealing of the valve element 46 with the O-ring 48 until a sufficient amount of liquid has been discharged into the outlet chamber O to prevent the suction of air into the pump system.

If the delivery tube 35 becomes blocked, the liquid level in the chamber O will rise causing a corresponding rise in the body 40. This is effective to move the arm 59 thereby causing the valve member 58 to close the passage 57 and stop the inflow of liquid to prevent the inlet chamber I from overflowing and completely wetting the body 32 so that all the chemicals are dissolved or dispersed in the liquid in the chamber I.

Since the invention may be easily disassembled without the use of tools, the periodic cleaning usually necessary in the use of tools, the periodic cleaning usually necessary in the use of liquid treatment devices may be simply and easily accomplished. Since the cleaning operation for the invention is so simple, the average user may effectively maintain the invention without the added cost of special tools and/or personnel.

Thus, it will be seen that the present invention provides a simple, effective and efficient means for the uniform treatment of liquids with chemicals and may be utilized with either suction discharge or gravity discharge without danger of overflowing the chamber 12. It will be understood that the unit of the present invention may lend itself to application of various types of recirculating apparatus, both in conjunction with filter systems and independently thereof.

It will be obvious to those skilled in the art that many variations may be made in the arrangement here chosen for the purpose of illustrating the operation of the present invention without departing from the scope thereof as defined by the appended claims.

What is claimed as invention is:

1. Device for feeding chemicals into a liquid by impinging a plurality of jets of liquid against the lower-end portion of a solid body of chemicals comprising:
    (a) an upper chamber having a liquid inlet passage;
    (b) a lower chamber having a liquid outlet passage;
    (c) a hollow tube positioned within said upper chamber for receiving the solid body of chemicals and defining at least one group of jet-forming orifices disposed in a region substantially corresponding to the lower portion of said tube;
    (d) an intermediate wall between the upper chamber and the lower chamber, said wall defining at least one port for discharging liquid from the tube into the lower chamber; and
    (e) flow control means for selectively opening and closing the liquid inlet passage in response to the level of liquid in the lower chamber, whereby liquid received in the upper chamber will jet through the orifices against the body of chemicals to cause generally uniform and progressive erosion of the body and thereafter pass into the lower chamber and out said liquid outlet passage, said flow control means including a valving means in the liquid outlet passage and a valving means in the liquid inlet passage constructed and arranged to selectively open and close both valving means in response to the liquid level in the lower chamber.

2. Device of claim 1 wherein the flow control means includes a valving means in the liquid outlet passage, a valving means in the liquid inlet passage and a float constructed and arranged to selectively open and close both valving means in response to the liquid level in the lower chamber.

3. Device of claim 1 wherein the float is constructed and arranged so that upward movement of the float in response to said liquid level in the lower chamber at least partially opens the valving means in the liquid outlet passage and at least partially closes the valving means in the liquid inlet passage.

4. Device of claim 1 constructed and arranged so that flow of water through the outlet passage is maintained while flow of water through the inlet passage is stopped.

5. Device of claim 1 constructed and arranged so that flow of water through the inlet passage is maintained while flow of water through the outlet passage is stopped.

6. Device of claim 1 constructed and arranged so that flow of water is maintained through both the inlet and outlet passages.

References Cited

UNITED STATES PATENTS

| | | | |
|---|---|---|---|
| 2,738,323 | 3/1956 | Tepas | 23—271 X |
| 3,094,134 | 6/1963 | Currie | 23—267 X |
| 3,095,005 | 6/1963 | Thompson | 137—268 |
| 3,190,726 | 6/1965 | Rudelick | 23—272 X |
| 3,203,440 | 8/1965 | Schneider | 137—268 |
| 3,227,524 | 1/1966 | White | 23—272 X |
| 3,323,539 | 6/1967 | Schneider et al. | 137—268 |

WILBUR L. BASCOMB, JR., Primary Examiner

S. J. EMERY, Assistant Examiner

U.S. Cl. X.R.

23—272.6, 311; 137—268; 239—310